Patented Jan. 7, 1947

2,413,973

UNITED STATES PATENT OFFICE 2,413,973

PHOTOPOLYMERIZATION OF VINYL AND VINYLIDENE COMPOUNDS

Benjamin W. Howk, Wilmington, Del., and Ralph A. Jacobson, Landenberg, Pa., assignors to E. I. du Pont de Nemours & Company, Wilmington, Del., a corporation of Delaware No Drawing. Application October 21, 1942, Serial No. 462,824

7 Claims. (Cl. 204—158)

This invention relates to durable coating compositions and more particularly refers to coating compositions containing certain polymerizable constituents and polymerization accelerators, processes for their use and articles coated therewith.

Numerous resins have been described in the literature. These resins have a wide variety of uses and in many cases are of particular value in the production of shaped articles such as sheets, rods, tubes and the like. Many of these shaped articles, however, are subject to the disadvantage that their surfaces are easily marred by rough handling. This is particularly true of those plastics which depend for their utility to a great extent upon their transparency and optical clarity. Among the plastics of this type reference may be made for purposes of illustration to polymerized methyl methacrylate.

In the prior art it is also known to coat non-plastic bases such as textile materials, wood and the like in order to improve their characteristics. The coating compositions used for this purpose are frequently subject to disadvantages which restrict greatly their usefulness. Among these disadvantages may be mentioned the lack of flexibility of the coating compositions, lack of resistance to high temperature and chemical agents such as organic solvents, inferior resistance to scratching and abrasion, etc.

It is an object of the present invention to overcome the aforesaid disadvantages of the prior art coating compositions and the numerous other disadvantages which directly or indirectly result therefrom. A further object is to produce coating compositions which may be readily applied to both plastic and non-plastic base materials. A still further object is to produce coating compositions which adhere tenaciously to the articles upon which they are coated and which increase surprisingly the wear-resistant characteristics of these articles. A still further object is to produce coating compositions which are particularly adapted for employment as surface protectors for shaped plastic articles generally. A still further object is to produce coating compositions which when applied to clear plastics do not detract from their clarity. A still further object is to produce coating compositions of improved hardness and resistance to organic solvents which may be applied readily to transparent, optically clear resins such as polymethyl methacrylate and which will protect the surface of the plastic and reduce greatly its susceptibility to scratching or other impairment. Additional objects will become apparent from a consideration of the following specification and claims.

These objects are attained in accordance with the present invention wherein coating compositions are produced by exposing to light a mixture containing a polymerizable material possessing but one polymer-producing unsaturated linkage in intimate admixture with a polymerizable material possessing a plurality of polymer-producing unsaturated linkages and a photopolymerization catalyst. In a more restricted sense this invention is concerned with coating compositions produced by exposing to light a mixture containing a polymerizable vinyl or vinylidene compound possessing but one polymer producing ethylenic linkage, in intimate admixture with a polymerizable compound possessing a plurality of polymer-producing terminal ethylenic linkages, and a photopolymerization catalyst. In a still more restricted sense this invention pertains to coating compositions produced by exposing to light a mixture containing a lower alkyl ester (1–4 carbon atoms) of an alpha-methylene monocarboxylic acid, i. e., a monocarboxylic acid having a methylene ($CH_2$) radical attached by an ethylenic double bond to the carbon atom alpha to the carbonyl carbon, and possessing but one polymer-producing ethylenic linkage, and particularly the lower alkyl esters of acrylic and methacrylic acids, in intimate admixture with an ester of an alpha-methylene monocarboxylic acid possessing a plurality of polymer-producing terminal ethylenic linkages, a photopolymerization catalyst and an oxygen-liberating catalyst. More particularly, this invention pertains to coating compositions produced by exposing to light a mixture containing partially polymerized methyl acrylate or methacrylate in intimate admixture with esters of acrylic and methacrylic acids having at least 2 vinyl or vinylidene groups in the molecule, benzoin, and lauroyl peroxide.

Specifically, this invention is directed to durable coating compositions of the foregoing type wherein the components are proportioned, mixed and reacted in a carefully predetermined manner. This invention is concerned in its preferred embodiment with the application of the foregoing coating compositions to base materials generally, plastics particularly, and transparent plastics such as polymethyl methacrylate preferably. The base materials coated with unpolymerized or partially polymerized compositions are subjected to a light treatment for a sufficient period of time and under such conditions as to produce a hard, clear coating thereon. This invention is also concerned with the coated articles produced as aforesaid.

In accordance with this invention a coating composition is made from a polymerizable material possessing but one polymer-producing unsaturated linkage in intimate admixture with a polymerizable material possessing a plurality of polymer-producing unsaturated linkages and a photopolymerization catalyst and exposing the mixture to the action of light. These coating compositions may also contain oxygen-liberating catalysts and agents which impart additional desirable characteristics to the resulting coatings or which facilitate the production or application of such coatings or further increase the desirable characteristics thereof.

Polymerizable materials possessing but one polymer-producing unsaturated linkage are well known in the art, and do not constitute a portion of this invention except to the extent that they are employed in accordance with the instructions hereof. Methyl methacrylate, methyl acrylate and styrene monomers are representative of these materials. Likewise, partially polymerized derivatives of the foregoing and related unsaturated materials may be employed for this purpose.

Polymerizable materials possessing a plurality of polymer-producing unsaturated linkages are also well known in the art and do not constitute a part of this invention except to the extent that they are employed in accordance with the instructions hereof. These materials are sometimes referred to as "cross-linking agents." Such materials generally possess two or more terminal ethylenic ($CH_2=C$) groups capable of participating in vinyl-type polymerization under the influence of suitable catalysts. Materials falling within this general category are ethylidene dimethacrylate, methylene dimethacrylate, methallyl methacrylate, allyl methacrylate, ethylene glycol dimethacrylate, hexamethylene glycol dimethacrylate, decamethylene glycol dimethacrylate, dimethallyl carbonate and the like.

Photopolymerization catalysts contemplated for use are those compounds or mixtures thereof which when subjected to the influence of light accelerate the polymerization reaction of the components with which they are in contact. These catalysts are members of two main classes, the alpha-ketaldonyl alcohols and the vicinal polyketaldo-carbonyl compounds.

The alpha-ketaldonyl alcohols are of the general formula $RCOCHOHR'$ where R and R' are the same or different and are hydrogen atoms, aliphatic or aromatic radicals, preferably hydrocarbon, whose free valences stem from carbon. Thus glycolic aldehyde is an illustration of an aliphatic alpha-ketaldonyl alcohol in which R and R' are hydrogen. Compounds in which R and R' are alkyl or aryl are known as acyloins. Acetoin ($CH_3COCHOHCH_3$) is an example in which both groups are aliphatic hydrocarbon, and benzoin represents an acyloin in which both of the groups are aromatic hydrocarbon. In addition to these specific compounds other acyloins are suitable for use herein.

Vicinal polyketaldo-carbonyl compounds are those which contain two or more adjoining ketaldo-carbonyl groups. The general formula for these materials is $R(CO)_nR'$. In this formula $n$ is 2 or greater and R and R' are the same or different and are aliphatic or aromatic radicals, preferably hydrocarbon, whose free valence stems from carbon. Thus, diacetyl represents a diketone in which the two groups are the same and are methyl groups; phenyl glyoxal represents a keto-aldehyde containing an aromatic group; and 1-phenyl butane-dione-1,2($C_6H_5COCOCH_2CH_3$) represents a diketone in which both aromatic and aliphatic groups occur. In addition to these specific examples, other vicinal polycarbonyl compounds are suitable for use herein.

The presence of the alpha-ketaldonyl alcohols, e. g., the acyloins, or the vicinal polyketaldocarbonyl compounds either alone or together with peroxides has a most advantageous effect on the rate of photopolymerization of the mixture of methyl methacrylate monomer or syrup, and the cross-linking agent.

The slow polymerization of ethylenic compounds by the catalytic action of light has been known for a considerable time. However, the discovery of photopolymerization catalysts for accelerating the rate of polymerization to a point comparable with other commercial processes of polymerization has never been described in the literature. In the present invention, adaptation of this discovery is made to a mixture, for example, of methyl methacrylate and a cross-linking agent whereby a hard coating is quickly obtainable at room temperature on the surface of shaped articles. More specifically, a cross-linking agent such as ethylidene dimethacrylate is added to the partially polymerized form of methyl methacrylate known as "syrup," which contains a photopolymerization catalyst such as benzoin or diacetyl and may also contain an oxygen-liberating catalyst such as lauroyl peroxide. The syrup is applied to the surface of the sheet, plate, or other shaped article which may be of polymethyl methacrylate or other plastic material to which the cross-linked interpolymer coating will have suitable adhesion. The syrup-coated article may be exposed to light of suitable intensity for a short time—10 to 120 minutes at room temperature is usually sufficient—in contact with a polished surface such as glass or metal. The cross-linked interpolymer coating is thereby formed as a thin surface coating on the shaped article. Usually the coated article can be separated from the glass or metal contact surface merely by slight pressure or at most by soaking for a few minutes in water. The article obtained possesses a hard, transparent, colorless optically perfect interpolymer coating on its surface. Polished plate glass provides an admirable surface for contact with the syrup-coated shaped article during polymerization. Obviously both sides of the shaped article—for example sheeting—can be coated simultaneously when glass is used. The source of light may be a mercury vapor lamp or some similar device which emits light of sufficient intensity in the range of the ultra-violet or visible light. Sunlight, infra red light, or even diffused daylight will also promote polymerization, which occurs rapidly under mild temperature conditions.

The preferred use of these compositions is for the coating of polymethyl methacrylate to render it wear-resistant. However, it is equally possible to apply these interpolymer coatings in a similar manner to other polyvinyl, acrylic or methacrylic derivatives, polystyrene, polyvinyl acetate, or even to opaque bodies such as wood, steel, paper, textiles, cellulose derivatives and many others.

The invention may be more readily understood by a consideration of the following illustrative examples wherein the quantities are stated in parts by weight:

Example I

A solution containing 97 parts of methyl methacrylate, 3 parts of ethylene glycol dimethacrylate, 0.14 part of lauroyl peroxide and 0.2 part of benzoin is flowed on one surface of polymethyl methacrylate sheeting. The latter is clamped between two plates of glass and exposed for several hours at 30° C. under a mercury arc light. The clamps are released, the plates separated, and the polymethyl methacrylate recovered with a thin surface layer of cross-linked polymethyl methacrylate forming a surface coating. The latter is more resistant to scratching than the uncoated side.

In many instances, a monomer mixture is not particularly well suited for coating purposes due to its very low viscosity. Hence, it is preferable to use a partially polymerized mixture of syrupy consistency as illustrated in the next example.

Example II

A syrup is prepared by heating and stirring a mixture of 98 parts of methyl methacrylate, 2 parts of ethylene glycol dimethacrylate, 0.14 part of lauroyl peroxide and 0.2 part of benzoin at 80° C. for one hour. The gel-like product is spread upon one surface of a polymethyl methacrylate sheet and the latter placed between two plates of glass. This sandwich is securely clamped together and exposed to ultra-violet light for several hours at room temperature. The plates are removed and the polymethyl methacrylate thereby obtained has one surface coated with a cross-linked interpolymer of superior hardness.

Usually a coating mixture resembling a gel cannot be applied as readily as a syrup, and in most instances a syrup is to be preferred. However, it is often difficult when preparing a syrup according to the procedure of the present example to avoid formation of a gel because at a certain point during the polymerization, cross-linking may occur very rapidly. In order to eliminate this possibility, a simple convenient method has been devised, modifications of which are described in Examples III and IV.

Example III

A partially polymerized methyl methacrylate in syrupy form is prepared by heating and stirring at 80° C. a mixture of 100 parts of methyl methacrylate and 0.14 part of lauroyl peroxide until a thick syrup is obtained. The casting mixture is prepared from this syrup by mixing 100 parts of syrup, 3.7 parts of a 10% solution of lauroyl peroxide in methyl methacrylate, 0.2 part of benzoin, and 3 parts of ethylidene dimethacrylate. The casting mixture is then flowed onto a polished plate of polymethyl methacrylate and the latter clamped firmly between two pieces of plate glass. The sandwich is exposed to the light from a mercury arc for several hours. The plate glass is removed and the polymethyl methacrylate obtained is coated with a thin, optically-perfect, hard, colorless, transparent film of cross-linked methyl methacrylate/ethylidene dimethacrylate interpolymer.

An alternative procedure for preparing the casting syrup by means of polymerization by light is described in the following Example IV.

Example IV

A mixture of 100 parts of methyl methacrylate, 0.14 part of lauroyl peroxide, 0.20 part of benzoin, and 3 parts of methylene dimethacrylate is heated and stirred at 60° C. while exposed to ultra-violet light until polymerization has proceeded to the syrupy stage. The syrup is flowed onto a sheet of polymethyl methacrylate sheeting. The latter is firmly clamped between two sections of plate glass and the sandwich exposed to ultra-violet light for 1 hour. The glass plates are separated and the polymethyl methacrylate sheeting obtained is coated with a thin, hard, transparent, colorless optically perfect film of a cross-linked methyl methacrylate/methylene dimethacrylate interpolymer.

Example V

A mixture of 98 parts of methyl methacrylate, 2 parts of ethylidene dimethacrylate, 0.14 part of lauroyl peroxide, and 0.2 part of diacetyl is heated for a few minutes at 100° C. The material sets to a gel. The gel is spread over the surface of a polymethyl methacrylate sheet. The latter is firmly clamped between two sections of plate glass and exposed to ultra-violet light for one hour. The plate glass is separated and a polymethyl methacrylate sheet is obtained with a hard interpolymer film covering its surface.

Example VI

A syrup of partially polymerized methyl methacrylate is prepared as described in Example III from 100 parts of methyl methacrylate and 0.14 part of lauroyl peroxide. The casting mixture is prepared from 100 parts of this syrup, 3 parts of methallyl methacrylate, and 0.2 part of benzoin. The casting mixture is then flowed onto a sheet of transparent polymethyl methacrylate sheeting, and the latter clamped firmly between two pieces of plate glass. The sandwich is exposed to the light from a mercury arc for two hours after which the plate glass is removed and the polymethyl methacrylate sheet obtained is covered with a thin, hard, optically-perfect, colorless, transparent film of cross-linked methyl methacrylate/methallyl methacrylate interpolymer.

Example VII

A syrup of partially polymerized methyl methacrylate is prepared as described in Example III from 100 parts of methyl methacrylate and 0.14 part of lauroyl peroxide. The casting mixture is prepared by adding 3 parts of decamethylene glycol dimethacrylate and 0.2 part of benzoin to 100 parts of the syrup. The casting mixture is flowed onto one side of a plate of polymethyl methacrylate of 0.5 inch thickness and the latter securely clamped to a highly polished metal plate with the coated side against the metal. The combination is exposed to ultra-violet light for 2 hours, the clamps released, and the metal plate separated from the polymethyl methacrylate plate. The coated surface of the latter is a thin, hard, colorless optically-perfect film of cross-linked methyl methacrylate/decamethylene glycol dimethacrylate interpolymer.

Example VIII

A syrup of partially polymerized methyl methacrylate is prepared as described in Example III from 100 parts of methyl methacrylate and 0.14 part of lauroyl peroxide. The casting mixture is prepared by adding 3 parts of hexamethylene glycol dimethacrylate and 0.2 part of benzoin to this syrup. The casting mixture is flowed onto one side of each of two sections of plate glass after which a section of polymethyl methacrylate is inserted between the glass plates in such a manner that the coated surfaces are in contact with the polymethyl methacrylate. The sandwich is securely clamped together and exposed to a mercury vapor light for one hour at room temperature. The sandwich is separated and the polymethyl methacrylate obtained with both sides coated with a thin, hard, clear, optically-perfect film of cross-linked methyl methacrylate hexamethylene glycol dimethacrylate interpolymer.

Example IX

A syrup of partially polymerized methyl methacrylate is prepared from 100 parts of methyl methacrylate, 0.14 part of lauroyl peroxide, 0.20 part of benzoin, and 3 parts of methallyl methacrylate according to the procedure described in Example IV. This casting syrup is applied to both sides of a section of transparent polystyrene sheeting, following which the latter is inserted between two glass plates and the whole securely clamped. The sandwich is exposed to a mercury vapor light at room temperature for 2 hours. The glass plates are separated and the polystyrene obtained with both sides coated with a hard, thin, transparent, optically-perfect cross-linked methyl methacrylate/methallyl methacrylate interpolymer.

Example X

A syrup of partially polymerized methyl methacrylate is prepared as in Example III from 100 parts of methyl methacrylate and 0.14 part of lauroyl peroxide. The casting mixture is prepared from 100 parts of this syrup, 3 parts of ethylidene dimethacrylate, and 0.1 part of benzoin. The syrup is flowed onto both sides of a transparent cellulose acetate sheet of 0.5 inch thickness and the sheet is inserted between two glass plates and the whole securely clamped together. The sandwich is exposed to the light from a mercury vapor arc at room temperature for one hour and the plates removed. The cellulose acetate sheet is obtained coated on both sides with a thin, hard, transparent film of cross-linked methyl methacrylate/ethylidene dimethacrylate interpolymer.

Example XI

A syrup of partially polymerized methyl methacrylate is prepared as in Example III from 100 parts of methyl methacrylate and 0.14 part of lauroyl peroxide. The casting mixture is prepared from 100 parts of this syrup, 3 parts of ethylidene dimethacrylate, and 0.1 part of benzoin. The syrup is flowed onto both sides of a transparent 85/15 vinyl chloride/vinyl acetate copolymer of 0.5 inch thickness and the sheet is inserted between two glass plates and the whole securely clamped together. The sandwich is exposed to the light from a mercury vapor arc at room temperature for one hour and the plates removed. The 85/15 vinyl chloride/vinyl acetate copolymer is coated on both sides with a thin, hard, transparent film of cross-linked methyl methacrylate/ethylidene dimethacrylate interpolymer.

Example XII

A syrup of partially polymerized methyl methacrylate is prepared as in Example III from 100 parts of methyl methacrylate and 0.14 part of lauroyl peroxide. The casting mixture is prepared from 100 parts of this syrup, 2 parts of ethylidene dimethacrylate and 0.1 part of benzoin. This syrup is spread onto muslin cloth and the latter inserted between two plates of glass and exposed to the light from a mercury vapor arc for 30 minutes. Upon separating the glass the muslin is obtained, coated and impregnated with hard, water-insoluble, cross-linked methyl methacrylate/ethylidene dimethacrylate interpolymer.

Example XIII

A sheet of absorbent paper such as that used for the manufacture of filter paper is coated and impregnated with a casting syrup prepared according to the method of Example XII. The coated and impregnated paper is placed between two glass plates and exposed to the light from a mercury vapor arc for 30 minutes. Upon separating the glass, the paper is obtained coated with hard, water-insoluble, cross-linked methyl methacrylate/ethylidene dimethacrylate interpolymer.

Example XIV

A white pine board is coated on one side with a casting syrup prepared according to the method of Example XII. The coated board is covered with plate glass and the two securely clamped after which the combination is exposed to a mercury vapor light for 2 hours. The glass is removed and the board obtained coated with a hard, thin, very smooth, film of cross-linked methyl methacrylate/ethylidene dimethacrylate interpolymer. The use of plate glass is unnecessary unless a flawless surface is desired.

Example XV

A syrup is made from methyl methacrylate monomer containing 0.1% benzoin and 0.14% lauroyl peroxide by exposure to ultra-violet light. The casting syrup is prepared from this product by adding 2.5% of methacrylic anhydride after which it is flowed onto a sheet of transparent 85/15 methyl methacrylate/styrene cast interpolymer. The sheet is then placed between two sections of plate glass and exposed to sunlight for one hour after which it is placed in an oven at 80° C. for 2 hours. The plate glass is removed and the polymethyl methacrylate/polystyrene interpolymer sheet coated with a hard, transparent, colorless, thin, cross-linked interpolymer of methyl methacrylate and methacrylic anhydride is obtained. Even on rainy days there is sufficient light to activate the reaction. An ultra-violet light lamp can be used providing the intensity of the light is regulated to avoid excessively rapid interpolymerization.

Example XVI

A solution containing 97 parts of methyl acrylate, 3 parts of ethylene glycol dimethacrylate, 0.14 part of lauroyl peroxide and 0.2 part of benzoin is flowed on one surface of polymethyl methacrylate sheeting. The latter is clamped between two plates of glass and exposed for several hours at 30° C. under a mercury arc light. The clamps are released, the plates separated, and the polymethyl methacrylate obtained with a thin surface coating of cross-linked polymethyl acrylate/ethylene glycol dimethacrylate interpolymer.

Example XVII

A syrup is prepared by heating and stirring a mixture of 98 parts of methyl acrylate, 2 parts of ethylene glycol dimethacrylate, 0.14 part of lauroyl peroxide and 0.2 part of benzoin at 80° C.

for 1 hour. The syrupy product is spread upon one surface of a polymethyl methacrylate sheet and the latter placed between two plates of glass. This sandwich is securely clamped together and exposed to ultraviolet light for several hours at room temperature. The plates are removed and the polymethyl methacrylate thereby obtained having one surface coated with a cross-linked interpolymer of methyl acrylate and ethylene glycol dimethacrylate.

Example XVIII

Partially polymerized methyl acrylate in syrupy form is prepared by heating and stirring at 80° C. a mixture of 100 parts of methyl acrylate and 0.14 part of lauroyl peroxide until a thick syrup is obtained. The casting mixture is prepared from this syrup by mixing 100 parts of syrup, 3.7 parts of a 10% solution of lauroyl peroxide in methyl acrylate, 0.2 part of benzoin, and 3 parts of ethylidene dimethacrylate. The casting mixture is then flowed onto a polished plate of polymethyl methacrylate and the latter clamped firmly between two pieces of plate glass. The sandwich is exposed to the light of a mercury arc for several hours. The plate glass is removed and the polymethyl methacrylate obtained coated with a thin optically-perfect, colorless, transparent film of cross-linked methyl acrylate/ethylidene dimethacrylate interpolymer.

Example XIX

A syrup of partially polymerized methyl acrylate is prepared as described in Example XVII from 100 parts of methyl acrylate and 0.14 part of lauroyl peroxide. The casting mixture is prepared from 100 parts of this syrup, 3 parts of methallyl methacrylate, and 0.2 part of benzoin. The casting mixture is then flowed onto a sheet of transparent polymethyl methacrylate sheeting, and the latter clamped firmly between two pieces of plate glass. The sandwich is exposed to the light of a mercury arc for 2 hours after which the plate glass is removed and the polymethyl methacrylate sheet obtained covered with a thin, optically-perfect, colorless, transparent film of cross-linked methyl acrylate/methallyl methacrylate interpolymer.

Example XX

A syrup of partially polymerized methyl acrylate is prepared as described in Example XVII from 100 parts of methyl acrylate and 0.14 part of lauroyl peroxide. The casting mixture is prepared by adding 3 parts of hexamethylene glycol dimethacrylate and 0.2 part of benzoin to this syrup. The casting mixture is flowed onto one side of each of two sections of plate glass after which a section of polymethyl methacrylate is inserted between the glass plates in such a manner that the coated surfaces of the glass are in contact with the polymethyl methacrylate. The sandwich is clamped together and exposed to a mercury vapor light for 1 hour at room temperature. The sandwich is separated and the polymethyl methacrylate obtained with both sides coated with a thin layer of optically-perfect crosslinked methyl acrylate/hexamethylene glycol dimethacrylate interpolymer.

Example XXI

A syrup of partially polymerized styrene is prepared by heating the monomer for 3 days at 70° C. The casting mixture is prepared from 100 parts of this syrup, 3 parts of methallyl methacrylate, 0.2 part of benzoin, and 0.2 part of benzoyl peroxide. The syrup is flowed onto a plate of polystyrene and the latter clamped firmly between two pieces of plate glass. The sandwich is exposed to the light of a mercury arc for several hours. The plate glass is removed and the polystyrene obtained coated with a thin, optically-perfect, colorless, transparent film of crosslinked styrene-methallyl methacrylate interpolymer.

Example XXII

A casting mixture is prepared from 100 parts of styrene syrup, 3 parts of methallyl methacrylate, 0.2 part of benzoin and 0.2 part of benzoyl peroxide by the procedure described in Example XX. The casting mixture is then flowed onto a polished plate of polymethyl methacrylate and the latter clamped firmly between two pieces of plate glass. The sandwich is exposed to the light of a mercury arc for several hours. The plate glass is removed and the polymethyl methacrylate obtained coated with a thin, opticallyperfect, colorless, transparent film of cross-linked styrene/methallyl methacrylate interpolymer.

It is to be understood that the foregoing examples are illustrative merely of a few of the many modifications to which this invention is susceptible. They may be varied widely with respect to the individual reactants, the amounts thereof, and the conditions of reaction without departing from the scope of this invention.

Polymerization of the coating compositions embraced herein is effected by subjecting them to the action of radiant energy in the form of light rays, both visible and invisible. The term light as herein used includes wave lengths both in the infrared and in the ultraviolet and, of course, wave lengths of all light in the intermediate visible spectrum. Light waves in the infrared are operable in effecting photopolymerization of the photopolymerizable mixtures herein described in the presence of the designated photopolymerization catalysts but the rate of photopolymerization is slower than in visible or in ultraviolet light. Light in the ultraviolet region having wave lengths shorter than 3200 Angstroms and, for example, down to 1800 Angstroms which is the limit of transmission of quartz is operable in this process. The most useful and effective light is generally that having wave lengths between about 2850 Angstroms and 7000 Angstroms. Thirty-two hundred Angstroms is the lower limit of transmission of ordinary plate glass, which material is frequently used in this process. Light having wave lengths above this band therefore is most frequently used. When "Pyrex" replaces ordinary glass in the operation of preparing coatings the lower limit of the light available is approximately 2850 Angstroms. This figure therefore represents a preferred lower limit whereas the upper preferred limit is 7000 Angstroms which represents the beginning of the less effective infrared band.

It is advantageous to use a system such that a controlled amount of light comes in contact with the material to be photopolymerized. The rate of the photopolymerization varies directly with the intensity of the light and can usually be increased or diminished by increasing or diminishing the intensity of the light that reaches the photopolymerizable mixture. A convenient source of light of proper intensity is the mercury vapor arc which emits light in the visible range as well as in the ultraviolet range. Another convenient source of light is a tungsten bulb giving light of suitable intensity. For example, a 1500 watt, 110 volt bulb will function effectively. Sunlight is another source of effective light for carrying out the photopolymerization in the presence of the designated photopolymerization catalysts. Diffused daylight contains wave lengths of light which are active for the catalyzed photopolymerization but the reaction is considerably slower than with other more intense sources of light. If desired, various filter media may be interposed between the source of light and the photopolymerizable coating compositions undergoing treatment to provide light within the ranges of specific wave lengths.

The time of light treatment will naturally depend upon many factors, including the coating compositions, the source of light, its intensity and its distance from the coated article. Since these factors will vary widely it is to be understood that no definite time limits can be given for all operations. As a general rule, however, a time of treatment varying from a few minutes to a few hours will usually be adequate.

The temperature at which the polymerization reaction is carried out is dependent upon the mixture undergoing polymerization and the rate of polymerization which is desired. As a general rule, a temperature of 20–25° C. is preferred, although temperatures up to approximately 100° C. may be used with excellent results. Temperatures above and below the aforementioned range are also contemplated for use although the results are frequently somewhat less satisfactory.

Photopolymerization catalysts have previously been referred to herein. They are compounds having a plurality of and preferably two to three vicinal carbon atoms, each attached by at least one valence to but one oxygen atom, at least one of said vicinal carbon atoms being attached by two valences to the oxygen atom, any valence of the remaining oxygen not satisfied by the carbons being satisfied by hydrogen, the terminal valences of the vicinal carbon atom chains being satisfied by hydrogen or by monovalent aliphatic or aromatic radicals whose free valences stem from carbon, said radicals preferably being hydrocarbons.

One group of photopolymerization catalysts falling under this general classification can be defined as alphaketaldonyl alcohols of formula RCOCHOHR′, wherein R and R′ are the same or different and are hydrogen atoms, monovalent aliphatic or monovalent aromatic radicals, whose free valences stem from carbon. R and R′ are preferably hydrocarbon. A sub-class falling under this generic classification is the acyloins which are organic compounds of the above type, wherein R and R′ are aliphatic or aromatic hydrocarbon and which are formed by the condensation of aldehydes. Illustrative of this general class of compounds are glycolic aldehyde, benzoin, acetoin, butyroin, 3-hydroxy-4-methylpentanone-2, toluoin, tertiary butylbenzoin, 12-hydroxy-13-keto-tetracosane, and o- and p-tert.-butyltoluoin. Of these, benzoin is the preferred specific compound.

A second class falling under the foregoing generic definition for the photopolymerization catalysts is the vicinal polyketaldo-carbonyl compounds which are compounds of the formula R—(CO)$_x$—R′ wherein $x$ is an integer of 2 or more, preferably 2, and R and R′ are hydrogen or monovalent aliphatic or aromatic radicals whose free valences stem from carbon. R and R′ are preferably hydrocarbon. Illustrative polyketaldonyl compounds include diacetyl; pentanedione-2,3; octanedione-2,3; 1-phenylbutanedione-1,2; benzil; 2,2-dimethyl-4-phenylbutanedione-3,4; glyoxal; phenylglyoxal; diphenyl triketone; and 1,2-cyclohexanedione. Of these, diacetyl is the preferred compound.

By "ketaldonyl" is meant compounds containing a ketone or aldehyde group. By "ketaldocarbonyl" is meant the CO group in an aldehyde or ketone as distinguished from the CO group of an acid.

The concentration of photopolymerization catalyst in the solution is of importance because it appreciably affects the rate of polymerization. Usually about 0.1% of benzoin or other alpha-ketaldonyl alcohols or of a compound such as diacetyl containing vicinal polyketaldo-carbonyl groups, based on polymerizable monomers is sufficient. However, either more or less catalyst, e. g., from 0.01% to 1.0%, can be used depending upon the nature of the cross-linking agent, the intensity of the light, and the rate of polymerization desired. The photopolymerization catalyst may be employed alone or in admixture with additional catalysts, but it is generally advisable to use it in conjunction with a peroxide-type catalyst.

Polymerizable materials possessing a plurality of polymer-producing unsaturated linkages have been described heretofore. These compounds are frequently referred to as "cross-linking agents." They are compounds which should have at least two unsaturated ethylenic groups capable of polymerization under the influence of light. The preferred compounds of this group have two terminal ethylenic groups (CH$_2$=C) at least one of which is conjugated with another multiple bond in the molecule. In the preferred compounds at least one of the terminal ethylenic groups is a vinyl or vinylidene group in an ester of acrylic or methacrylic acid. Some of the preferred cross-linking agents already enumerated in the examples include methylene dimethacrylate, ethylidene dimethacrylate, ethylene glycol dimethacrylate, hexamethylene glycol dimethacrylate, decamethylene glycol dimethacrylate, allyl methacrylate, methallyl methacrylate, and vinyl methacrylate. Many other compounds falling within the scope of the aforesaid definition may be added thereto or substituted therefor. Examples of a representative few of these are: diallyl carbonate, dimethallyl carbonate, tetraallyl silicate, tetramethallyl silicate, methacrylic anhydride, tetramethylene dimethacrylamide, hexamethylene dimethacrylamide, divinylbenzene, and diolefins such as isoprene and chloroprene, etc. Mixtures of these compounds can be used.

The amount of cross-linking agent employed may vary from a fraction of 1% to as much as 50% or more based upon the amount of polymerizable material possessing but one polymer-producing unsaturated linkage. When this latter material is partially polymerized methyl methacrylate or the monomer thereof, amounts of cross-linking agent lying in the range of 1% to 5% thereof produce excellent results.

The polymerizable material possessing but one polymer producing unsaturated linkage can be defined as a photopolymerizable vinyl or vinylidene compound having but one polymer producing group in the molecule. The preferred compounds are the lower alkyl (1–4 carbon) esters of alpha-methylene monocarboxylic acids having a methylene (CH$_2$) group in the position alpha to the carbonyl of the acid group. Of these compounds the most preferred is methyl methacrylate. Samples of suitable compounds are vinylidene chloride; acrylic and methacrylic acids, esters, and amides thereof, for example, methyl acrylate, methyl methacrylate, methyl chloroacrylate, methacrylamide and acrylamide; methyl vinyl ketone; vinyl acetate; vinyl propionate; vinyl chloroacetate; acrylonitrile; methacrylonitrile, styrene, and vinyl naphthalene. Mixtures of these compounds can be used.

The coating compositions embraced within the scope of this invention may be prepared by several different methods, illustrations of which are:

Method (A)

In some cases a solution containing monomeric methyl methacrylate, a cross-linking agent, catalyst, and photopolymerization catalyst may be applied to the shaped article and the latter exposed to a mercury vapor light in contact with the polished surface such as glass. Ordinarily this is the least desirable of the several procedures because the monomer mixture is too mobile due to its low viscosity. It is preferable, therefore, to prepare a coating mixture of syrupy consistency because this can be more readily flowed or brushed. The alternative methods of preparing coating syrups are illustrated in the examples but may be summarized as follows.

Method (B)

Mix the monomeric methyl methacrylate, cross-linking agent, peroxide catalyst, and photopolymerization catalyst. Heat at 60–80° C. with stirring until syrupy, after which the syrup may be flowed, spread or brushed upon the shaped article or the latter may be dipped into the syrup. This method of preparation of the coating syrup has the disadvantage that partial gelation may occur with subsequent difficulties of applying the syrupy gel.

Method (C)

Mix the monomeric methyl methacrylate and the peroxide catalyst. Heat at 60–80° C. with stirring until a syrupy consistency is reached. Add the cross-linking agent and photopolymerization catalyst to the syrup which is now ready for coating purposes.

Method (D)

Prepare a syrup from methyl methacrylate monomer containing peroxide catalyst and photopolymerization catalyst using ultra-violet light for polymerization. The casting syrup may be obtained by adding the cross-linking agent in its monomeric form.

Method (E)

Expose a mixture of methyl methacrylate monomer, cross-linking agent, peroxide catalyst, and photopolymerization catalyst to ultra-violet light at 40–50° C. until a syrupy consistency is reached. This syrup can be used directly for coating purposes.

The oxygen-liberating catalysts of the invention are preferably organic solvent soluble peroxides such as lauroyl peroxide and benzoyl peroxide. The invention is not, however, restricted thereto since other oxygen-liberating catalysts, for example, acetyl peroxide, butyrolyl peroxide, succinoyl peroxide and ascaridole, or mixtures thereof may be employed. These catalysts should be appreciably soluble in the methyl methacrylate or other polymerizable material employed in the coating composition and the solutions thereof should generally be clear.

The amount of oxygen-liberating catalyst employed may vary widely depending upon the components of the coating composition and the conditions of reaction, as well as the characteristics which are desired in the ultimate product. In the case of lauroyl peroxide and benzoyl peroxide amounts ranging from 0.1% to 0.5%, based upon the amount of methyl methacrylate or similar polymerizable material are used in the composition. While the foregoing quantities are preferred it is understood that larger or smaller quantities of the same or other catalysts may be used. The precise amount used will be governed to a large extent by the solubility of the catalyst in the methyl methacrylate or similar polymerizable material employed. If too much catalyst is used it is apt to result in a cloudy solution which is generally undesirable. Peroxides are not necessary in this reaction and frequently light alone gives a sufficiently rapid polymerization.

The following are a representative group of the base materials which may be coated with the previously described compositions: Plastic materials of various sorts, such as polymethyl methacrylate, polystyrene, polyvinyl acetate, polyvinyl alcohol, vinyl chloride/vinyl acetate interpolymers, urea-formaldehyde plastics, phenol-formaldehyde plastics, glyptal plastics, cellulose derivatives such as cellulose acetate, cellulose ethers, cellulose nitrate, cellulose propionate, cellulose acetobutyrate, vinyl chloride/vinylidene chloride copolymers, casein-formaldehyde plastics, "Cellophane," cloth; fabrics; wood, paper, leather; and other materials upon which it is desired to deposit a hard, transparent, water-insoluble coating.

It is understood, of course, that the foregoing base materials and others suggested thereby may have applied thereto a plurality of layers of coating compositions. These compositions may be identical or may be different, depending upon the use which is to be made of the resulting product. By an application of a multiplicity of like or unlike layers, it is possible to produce coated articles which have a wide range of desirable characteristics.

By means of this invention a new class of coating compositions has been made available. These compositions may be produced readily and may be applied economicaly to numerous base materials of a plastic or non-plastic nature. When applied to the base material they adhere thereto tenaciously and protect it from injury due to rough handling or other causes. In particular, these compositions may be used for the protection of transparent plastics such as polymethyl methacrylate. When applied to plastics of this type they protect the surface thereof under conditions wherein the uncoated article would be irreparably damaged.

Advantages of this invention are several fold. Since the process using light polymerization can be operated at room temperature, this process has an outstanding advantage over any former heat polymerization process for rapidly applying the surface coating in that there is no warping effect due to heat absorbed by the coated material. Furthermore, since the process can be carried out rapidly, there is no undue loss of monomer from the surface due to heat volatilization. This process makes possible the practical use of plastic materials which have good properties in bulk, such as transparency or toughness, but which have poor surface characteristics, for example, softness or insufficient solvent resistance. This process provides a practical solution to the difficult problem of applying particularly to organic plastics formed from vinyl polymers the coatings comprising a related polymeric material giving improved surface characteristics to the whole.

As many widely different embodiments of this invention may be made without departing from the spirit and scope thereof, it is to be understood that the invention is not limited to the specific embodiments thereof except as defined in the appended claims.

We claim:

1. A process which comprises coating a preformed plastic article with a composition comprising a photopolymerizable member selected from the class consisting of vinyl and vinylidene compounds possessing but one vinyl or vinylidene group, a cross-linking compound containing at least two terminal ethylenic groups at least one of which is conjugated with another multiple bond in the molecule, and a photopolymerization catalyst selected from the group consisting of alpha ketaldonyl alcohols and vicinal polyketaldocarbonyl compounds, and polymerizing said coating composition by subjecting it to the action of light having a wave length between 1800 and 7000 Angstroms at a temperature which will not injure the plastic base.

2. A process which comprises coating a relatively soft, transparent pre-formed plastic article with a composition comprising a photopolymerizable methacrylate possessing but one vinyl or vinylidene group, a photopolymerizable methacrylate possessing two terminal ethylenic groups at least one of which is conjugated with another multiple bond in the molecule, and a photopolymerization catalyst selected from the group consisting of alpha ketaldonyl alcohols and vicinal polyketaldocarbonyl compounds, and polymerizing said coating composition by subjecting it to the action of ultra violet light at a temperature which will not injure the plastic base.

3. A process which comprises coating a preformed plastic article comprising polymethyl methacrylate with a composition comprising a photopolymerizable methacrylate possessing but one vinyl or vinylidene group, a photopolymerizable methacrylate possessing two terminal ethylenic groups at least one of which is conjugated with another multiple bond in the molecule, and an acyloin, and polymerizing said coating composition by subjecting it to the action of ultra violet light at substantially room temperature.

4. A process which comprises coating a preformed plastic article comprising a polymethyl methacrylate with a composition comprising methyl methacrylate, a photopolymerizable methacrylate possessing two terminal ethylenic groups at least one of which is conjugated with another multiple bond in the molecule, and benzoin, and polymerizing said coating composition by subjecting it to the action of ultra-violet light at substantially room temperature.

5. A process which comprises coating one surface of a polymethyl methacrylate sheeting with a solution containing 97 parts of methyl methacrylate, 3 parts of ethylene glycol dimethacrylate, 0.140 part of lauroyl peroxide and 0.2 part of benzoin, then clamping the so-coated sheet between two plates of glass and exposing it for several hours at 30° C. under a mercury arc light.

6. A process which comprises coating a sheet of a polymethyl methacrylate with a solution containing partially polymerized methyl methacrylate, methallyl methacrylate and benzoin, and polymerizing said coating by subjecting it to the action of ultra-violet light at a temperature which will not injure the plastic base.

7. A process which comprises coating a sheet of a polymethyl methacrylate with a solution containing partially polymerized methyl methacrylate, hexamethylene glycol dimethacrylate and benzoin, and polymerizing said coating by subjecting it to the action of ultra-violet light at a temperature which will not injure the plastic base.

BENJAMIN W. HOWK.
RALPH A. JACOBSON.